(12) United States Patent
Ängquist

(10) Patent No.: US 7,317,301 B2
(45) Date of Patent: Jan. 8, 2008

(54) AUXILIARY POWER SUPPLY

(75) Inventor: Lennart Ängquist, Enköping (SE)

(73) Assignee: ABB AB, Västeråa (SE)

( * ) Notice: Subject to any disclaimer, the term of this patent is extended or adjusted under 35 U.S.C. 154(b) by 0 days.

(21) Appl. No.: 10/533,874

(22) PCT Filed: Nov. 10, 2003

(86) PCT No.: PCT/SE03/01731

§ 371 (c)(1),
(2), (4) Date: Oct. 4, 2005

(87) PCT Pub. No.: WO2004/045046

PCT Pub. Date: May 27, 2004

(65) Prior Publication Data

US 2006/0152199 A1    Jul. 13, 2006

(30) Foreign Application Priority Data

Nov. 13, 2002 (SE) .................................. 0203374

(51) Int. Cl.
*G05F 1/70* (2006.01)
*H02J 11/00* (2006.01)
(52) U.S. Cl. ............................ 323/208; 307/45; 307/98
(58) Field of Classification Search ................ 323/205, 323/207–210; 363/35, 97, 131; 361/601, 361/602, 603; 307/105, 44, 45, 98
See application file for complete search history.

(56) References Cited

U.S. PATENT DOCUMENTS

| 3,381,178 | A  |   | 4/1968 | Rockefeller, Jr. |
| 4,271,462 | A  |   | 6/1981 | Peters |
| 5,396,165 | A  | * | 3/1995 | Hwang et al. ............... 323/210 |
| 5,414,612 | A  | * | 5/1995 | Bjorklund et al. ............ 363/35 |
| 5,757,099 | A  | * | 5/1998 | Cheng et al. ................ 307/105 |
| 6,370,050 | B1 | * | 4/2002 | Peng et al. .................... 363/98 |
| 6,552,919 | B1 | * | 4/2003 | Bors ........................... 363/42 |

* cited by examiner

*Primary Examiner*—Gary L Laxton
(74) *Attorney, Agent, or Firm*—Venable LLP; Eric J. Franklin

(57) ABSTRACT

An auxiliary power supply equipment for a high voltage installation includes a power source at ground potential, a load circuit at high potential, and a transmission link for coupling the power source to the load circuit. The power source includes a high frequency voltage generator, and the transmission link comprises a first and a second current path. Each path is closed by capacitive coupling to provide insulation between the ground potential and the high potential, and each current path has a reactive compensation means for series compensation of reactive power generated by the capacitive coupling.

24 Claims, 4 Drawing Sheets

AUXILIARY POWER SUPPLY

CROSS-REFERENCE TO RELATED APPLICATIONS

This application claims priority to Swedish patent application 0203374-4 filed 13 Nov. 2002 and is the national phase under 35 U.S.C. § 371 of PCT/SE2003/001731.

TECHNICAL FIELD

The present invention relates to a method for supplying auxiliary power to a high voltage installation, and to an auxiliary power supply equipment for a high voltage installation, having a power source at ground potential, a load circuit at high potential, and a transmission link for coupling the power source to the load circuit.

High voltage is in this context considered to be a voltage in the range typically between 130 kV and 800 kV.

Auxiliary power is in this context considered to be a power typically in the range of tens to hundreds of watts.

High frequency is in this context considered to be a frequency that is at least two orders of magnitude higher than the system frequency of the high voltage installation, typically in the range of 10-100 kHz.

BACKGROUND ART

High voltage installations in high voltage power transmission systems comprise apparatus that are located close to or in galvanic contact with the high voltage circuit. Examples of such apparatus are switching elements, series capacitors, sensors for voltage and current, and monitoring and protective equipment.

Such apparatus require auxiliary power for their operation and various methods and means for supply thereof exist in the state of the art.

According to one known principle, the auxiliary power is tapped off from the high voltage circuit, for example by the use of voltage or current transformers. The method thus requires that the high voltage circuit is energized and, to ensure proper operation of the apparatus in question, that after the energization, it has settled to such an extent that the auxiliary power can be safely used. However, the energization process is often a critical event in the operation of the high voltage circuit, and consequently, an auxiliary power supply that is independent of the state of the high voltage circuit is highly desirable.

According to another known principle, the auxiliary power is generated at ground voltage potential and transmitted to the high voltage circuit. In the high voltage installations in question, such auxiliary power is usually available at ground level as a direct voltage supply, for example at 110 DC, supported by a battery backup.

A basic problem is then to provide insulation between the ground voltage potential and the high voltage potential of the high voltage installation. Means for providing such insulation have to satisfy the requirements set by international norms and standards.

One known method, used in particular for switching elements such as circuit breakers and disconnectors, is to create a mechanical movement at ground potential and transmit this movement to high potential using insulating rods, which rods thus provide the necessary insulation between the two different potentials. The method requires a driving mechanism at ground potential and rod and link system at high potential that makes the equipment mechanically complex and results in unavoidable delays in the operating times.

Another known method, used in particular in connection with current and voltage sensors, is to convert the auxiliary power at ground potential to optical power, transmit the power to high potential via an optical link, and then convert the optical power back to electric power. With this method only very small amounts of power, typically in the order of fractions of watts, can be transmitted.

Thus, there is a need for an auxiliary power supply equipment wherein the power is generated at ground level to make it independent of the state of the high voltage circuit, and which equipment can handle amounts of power sufficient for the operation of high power apparatus such as switching element and series capacitor installations.

SUMMARY OF THE INVENTION

It is an object of the invention to provide an improved auxiliary power supply equipment for a high voltage installation, and a method for supplying auxiliary power to a high voltage installation, the improvement eliminating the above mentioned disadvantages with known equipment and methods.

According to the invention this object is accomplished by an auxiliary power supply equipment for a high voltage installation, having a power source at ground potential, a load circuit at high potential, and a transmission link for coupling the power source to the load circuit, wherein the power source comprises a high frequency voltage generator, the transmission link comprises a first and a second current path, each path being closed by capacitive coupling to provide insulation between the ground potential and the high potential, and each current path having a reactive compensation means for series compensation of reactive power generated by the capacitive coupling.

In a development of the invention said reactive compensation means comprises an inductor in series connection with the capacitive coupling.

In a further development of the invention the auxiliary power supply equipment comprises means for adaptation of the power source to the load.

In another development of the invention, the first and the second current path each comprises a series connection of the reactive compensation means and a coupling capacitor coupled to a conductor at the high voltage installation.

In another development of the invention, wherein the high voltage installation is a series capacitor equipment mounted on a platform insulated from ground, for one of said current paths said capacitive coupling is provided by a stray capacitance between said platform and ground.

In a further development of the invention, wherein said voltage generator generates a voltage of a pre-selected frequency, in each of said current paths said reactive compensation means are selected to form a series resonant circuit with said capacitive coupling at the pre-selected frequency.

Further advantageous developments of the invention will become clear from the following description and patent claims.

With auxiliary power supply equipment according to the invention, it will for example be possible to locate protective and monitoring equipment for series capacitor installations directly on the platform rather than communicating measured values and command signals between high voltage level and ground potential.

Driving mechanisms for switching equipment can be located at high potential, thereby reducing operating times and avoiding complex mechanical devices.

BRIEF DESCRIPTION OF THE DRAWINGS

The invention will be explained in greater detail by description of embodiments with reference to the accompanying drawings, which are all schematic and drawn as combined block- and single line diagrams, only showing main components which are of relevance for the understanding of the invention, and wherein.

DESCRIPTION OF PREFERRED EMBODIMENTS

The following description relates to the equipment and to the method.

Same reference numbers and labels are used in the various figures to signify parts that are of the same kind.

Figure 1:
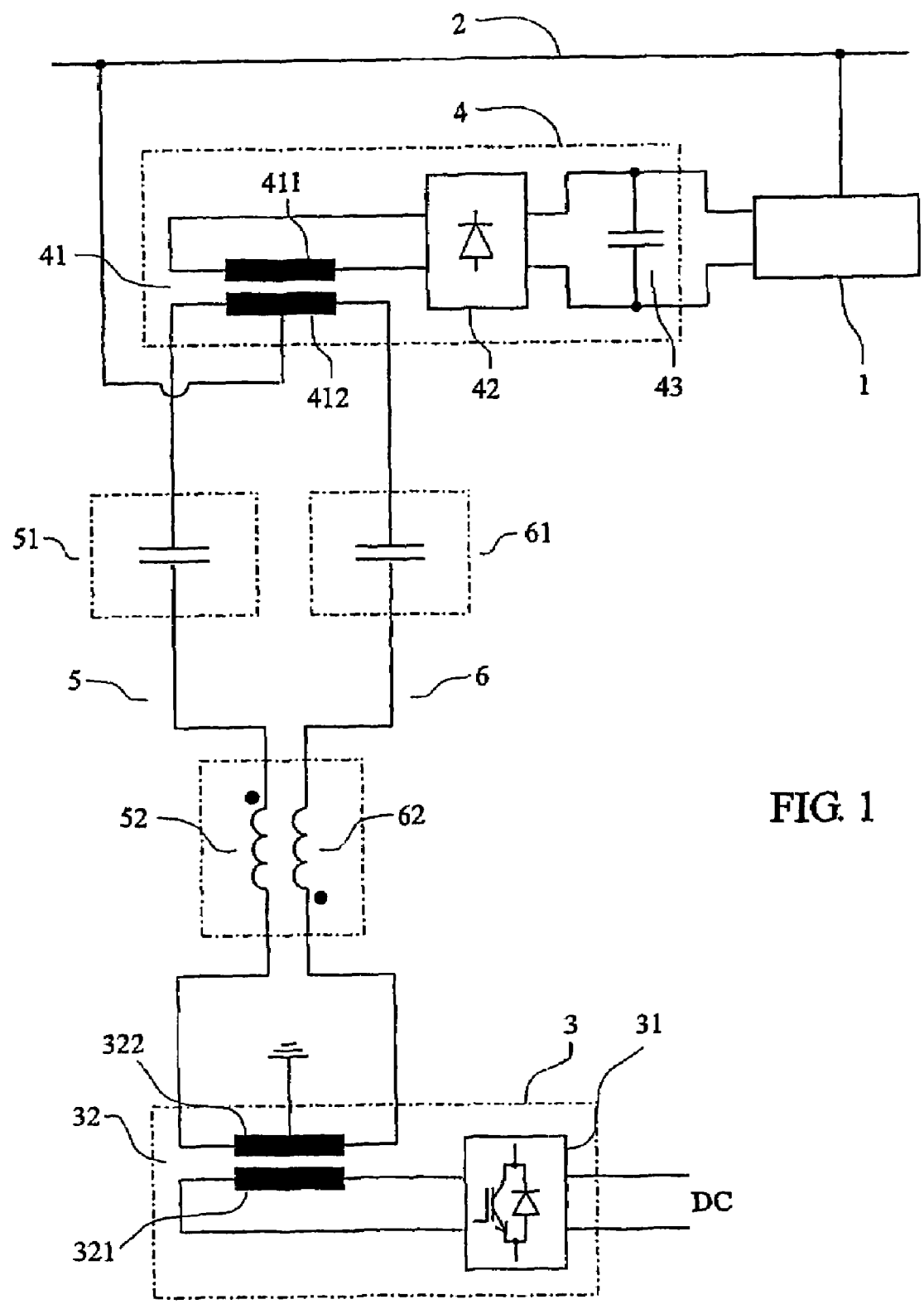
FIG. 1 shows a first embodiment of the invention.

FIG. 1 shows a high voltage installation 1 in galvanic contact with a conductor 2. The installation may typically comprise switching elements such as circuit breakers or disconnectors, series capacitors, sensors for voltage and current, and/or monitoring and protective equipment.

A power source 3, located at ground level and at ground potential, comprises a high frequency voltage generator 31 in the form of a high frequency DC/AC-converter, and a ground level transformer 32.

The DC/AC-converter is supplied with a DC-voltage, in the figure designated with DC, and the output of the DC/AC-converter is supplied to a primary winding 321 of the ground level transformer. The ground level transformer has a secondary winding 322.

A load circuit 4, located at the high voltage installation and at high potential, comprises a load transformer 41, an AC/DC-converter 42, and a capacitor 43. The AC-side of the AC/DC-converter is coupled to a secondary winding 411 of the load transformer, and the DC-side of the AC/DC-converter is coupled to the high voltage installation to supply it with auxiliary power. The capacitor is coupled across the DC-side of the AC/DC-converter to provide energy storage and to filter the output voltage of the SC/DC converter.

The load transformer has a primary winding 412.

According to the invention, a transmission link between the power source and the load circuit is established by forming a first current path 5 and a second current path 6. In the embodiment of the invention illustrated in FIG. 1, the current path 5 comprises in series connection a coupling capacitor 51 and a first inductor 52, and the current path 6 comprises in series connection a coupling capacitor 61 and a second inductor 62.

By coupling each of the current paths between a respective end of the secondary winding 322 of the ground level transformer and of the primary winding 412 of the load transformer, a closed current loop comprising the power source, the current paths, and the load circuit is formed. In this current loop, the coupling capacitors 51 and 61 each forms a capacitive coupling that provides insulation between the ground potential and the high potential.

The coupling capacitors generate reactive power and it is desirable to compensate for this power. The compensation has to be a series compensation in order to preserve the insulation. The first and the second inductor serve as reactive compensation means by consuming reactive power.

By a control system known per se, the voltage generator can be adapted to generate a voltage of a pre-selected frequency. It is then advantageous to select the inductance values of the inductors so that the inductors form, in each of the current paths, a series resonant circuit with the coupling capacitors at the pre-selected frequency. Thereby, the current paths will in principle exhibit zero reactance.

FIG. 1 also shows that the secondary winding 322 of the ground level transformer has a centre tap that is coupled to ground, and that the primary winding 412 of the load transformer has a centre tap that is coupled to the conductor 2. The result is a balanced current loop that has as effect that the voltage of the system frequency of the high voltage installation at the conductor 2 will create common mode currents in the two current paths.

In the figure, the winding of inductor 52 is shown with a dot at the end of the winding coupled to the coupling capacitor, whereas the winding of inductor 62 is shown with a dot at the end of the winding that is coupled to the load transformer. By arranging the inductors to have a close coupling between their windings, e.g. by having a common ferrite core, and being wound in a sense illustrated by the dots, it is realised that common mode currents such as a current of the system frequency of the high voltage installation, will not create any resulting magnetic flux in the inductors and that the current paths will thus exhibit a low impedance for common mode currents.

The ground level transformer and the load transformer are used for adaptation of the power source to load by impedance matching.

Figure 2:
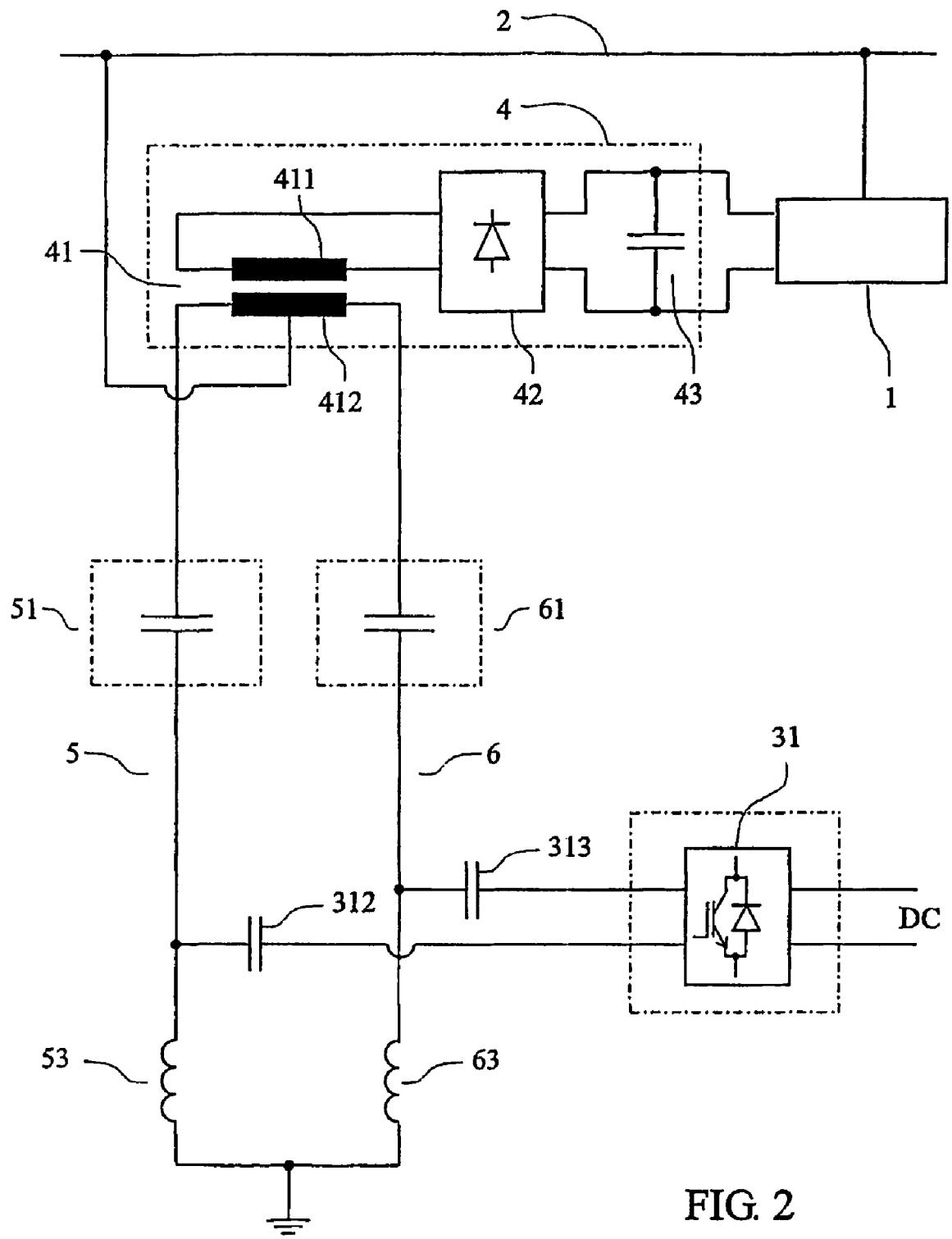
FIG. 2 shows a second embodiment of the invention.

FIG. 2 shows a high voltage installation 1, a conductor 2, a load circuit 4, a first current path 5, a second current path 6, coupling capacitors 51 and 61, and a power source 31 in the form of a high frequency DC/AC-converter, as described above with reference to FIG. 1.

In this embodiment, the auxiliary power is supplied by the power source via so-called tank circuits. A first tank circuit has a series coupling of a capacitor 312 and an inductor 53, and a second tank circuit has a series coupling of a capacitor 313 and an inductor 63. The first current path 5 is formed by coupling the coupling capacitor 51 to ground via the inductor 53. The second current path 6 is formed by coupling the coupling capacitor 61 to ground via the inductor 63.

The high frequency output voltage of the DC/AC-converter is capacitively coupled to the junctions between the respective coupling capacitors and the inductors via the capacitors 312 and 313.

In this embodiment of the invention, the parallel coupling of the capacitor 312 and the inductor 53, respectively the parallel coupling of the capacitor 313 and the inductor 63, forms the reactive compensation means.

When the output voltage of the DC/AC converter 31 is applied to the respective tank circuits, and the frequency of the applied voltage is close to the resonance frequency of the tank circuit, an amplification of the applied voltage takes place, resulting in a voltage across the components of the tank circuit that is feasible to use for transmitting the desired auxiliary power to the load circuit. When the frequency of the applied voltage exceeds the resonance frequency of the tank circuit, the tank circuit will absorb reactive power to compensate for the reactive power generated by the coupling capacitors.

By proper selection of the inductance and the capacitance values for the components of the tank circuits, the desired reactive compensation of the reactive power generated by the coupling capacitors, as well as an adaptation of the power source to the load, may be achieved. The inductors 53 and 63 can be selected to have an inductance that causes only a very low voltage drop for the current at the system frequency of the high voltage installation.

High voltage series capacitor equipment is mounted on platforms that are insulated from ground, usually one platform for each phase. A more detailed description of the physical and electrical configuration of such equipment is given for example in M Adolfsson et al: EHV series capacitor banks. A new approach to platform to ground signalling, relay protection and supervision. IEEE Transactions on Power delivery, April 1989, pp 1369-1375, which is hereby incorporated by reference. The series capacitor is coupled between what are commonly called an LV bus and an HV bus, which buses are coupled into the transmission line, and the platform is coupled to the LV bus.

Platforms of this kind are quite large, having an area that usually is in the order of 100 square meters, and they are located at heights above ground typically in the range of 5-8 meters for system voltages in the range of 300-800 kV. Thus, the platforms exhibit a substantial capacitance to ground, in the order of hundreds of pF, and it has been found to be technically feasible to use in one of the current paths the capacitance between a platform and ground to form the capacitive coupling according to the invention.

Figure 3:
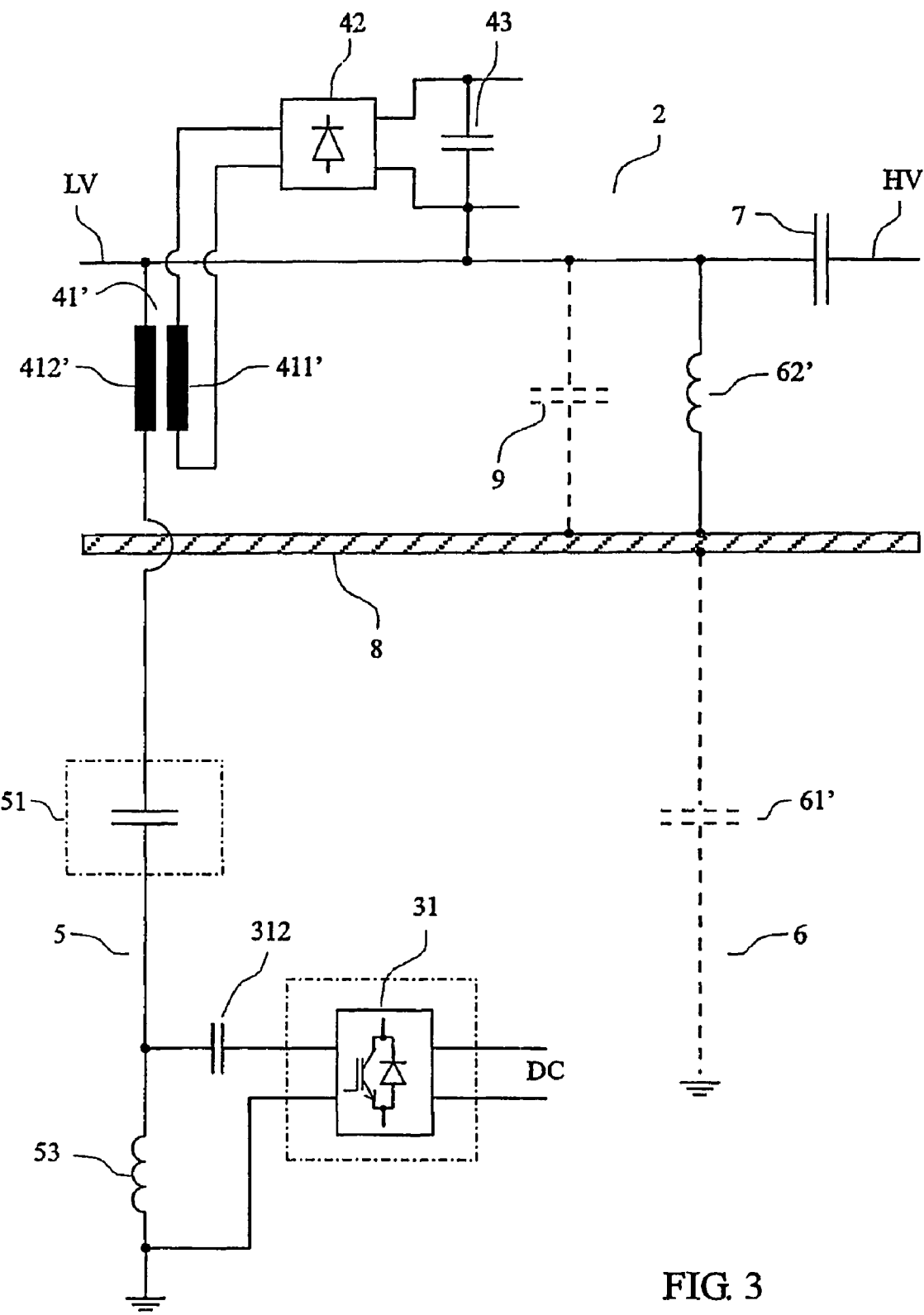
FIG. 3 shows a third embodiment of the invention.

FIG. 3 shows a high voltage installation 1 in the form of high voltage series capacitor equipment mounted on a platform insulated from ground. The series capacitor equipment is shown schematically only with parts that are of relevance for the present invention.

A series capacitor 7 is coupled to the LV-bus, in the figure for short designated as LV, and to the HV-bus, in the figure for short designated as HV. The buses are inserted in a conductor 2. The equipment is located on a platform 8. There is a stray capacitance 9 between the LV bus and the platform, and a stray capacitance 61' between the platform and ground. An inductor 62' is galvanically coupled between the LV bus and the platform.

Thus, in this embodiment of the invention, the second current path 6 is formed by a series coupling of the stray capacitance 61' and the inductor 62' which is in parallel coupling with the stray capacitance 9, wherein the last mentioned parallel circuit forms the reactive compensation means for the second current path.

The first current path 5 is formed by a coupling capacitor 51 as described above with reference to FIGS. 1 and 2, the coupling capacitor being coupled to ground via a tank circuit similar to the tank circuit of the first current path as described with reference to FIG. 2.

The load circuit comprises a load transformer 41' with a primary winding 412' and a secondary winding 411'. The coupling capacitor is coupled to the LV bus via the primary winding of the load transformer in series connection. The secondary winding 411' is coupled to an AC/DC converter 42.

Adaptation of the power source to the load and the reactive compensation for the first current path is performed as described with reference to FIG. 2. For the second current path, the reactive compensation means, i.e. the inductor 62' in parallel coupling with the stray capacitance 9, is adapted to resonance with the stray capacitance 61' by proper selection of the inductor 62'.

The capacitance value of the stray capacitance 9 may be subject to variations in dependence on the local weather conditions, in particular rain- or snowfall. In order to maintain the resonant state of the current path 6, the frequency of the high frequency voltage generator 31 may be controlled by a frequency control system. Such a control system can be based on, for example, a measured value of the reactive output power of the generator and on a condition that the absolute value of that power shall be minimized.

Figure 4:
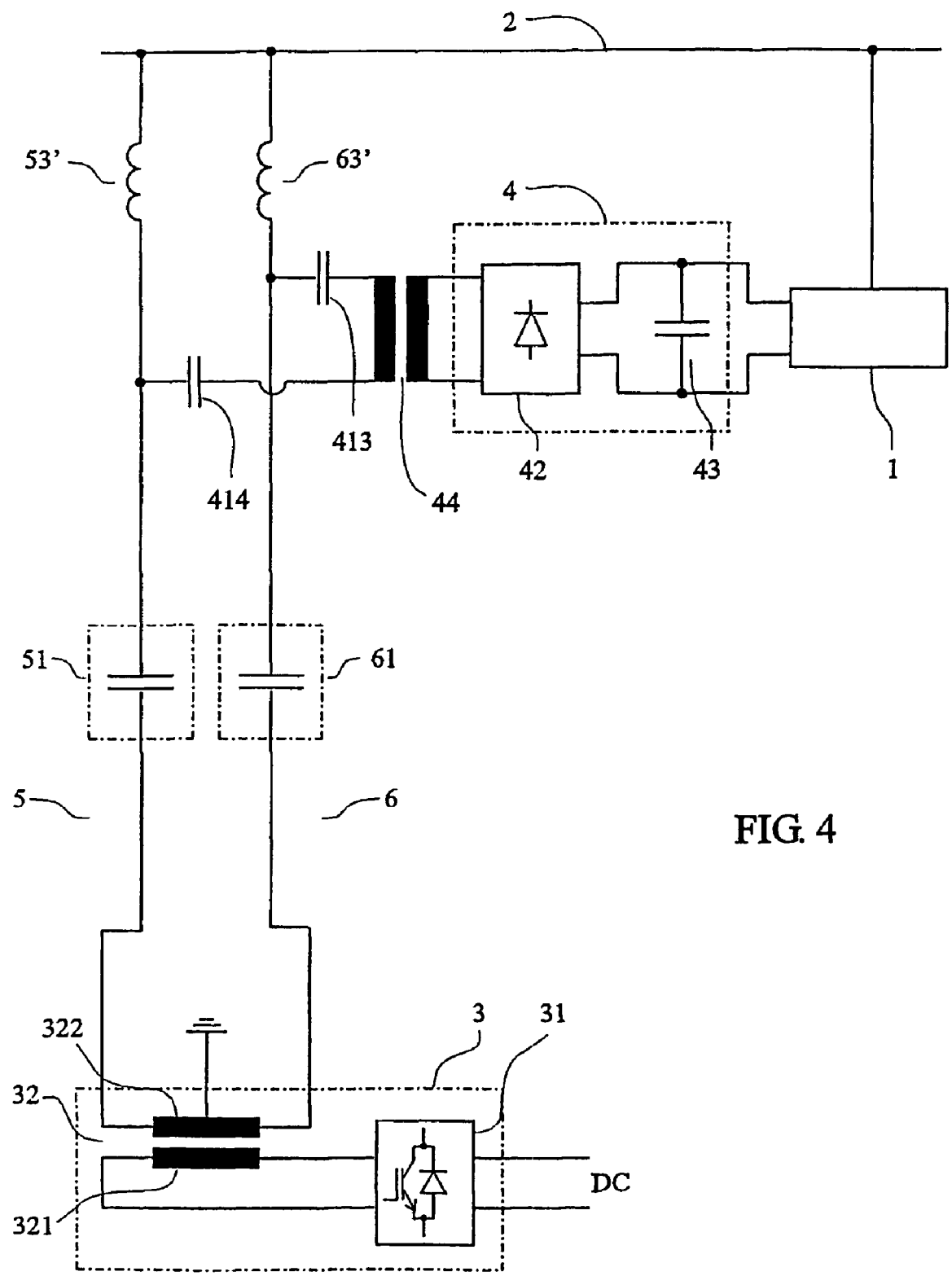
FIG. 4 shows a fourth embodiment of the invention.

FIG. 4 shows another embodiment of the invention, having tank circuits at the load circuit. The power source 3, located at ground level and at ground potential, is similar to the power source as described with reference to FIG. 1. The first current path is formed by a series connection of a coupling capacitor 51 and an inductor 53', the capacitor 51 being coupled to one end of the secondary winding 322 of the ground level transformer, and the inductor 53' being coupled to the conductor 2. The second current path is formed in analogous way by a series connection of a coupling capacitor 61 and an inductor 63', the capacitor 61 being coupled to the other end of the secondary winding of the ground level transformer, and the inductor 63' being coupled to the conductor 2.

The auxiliary power transmitted via the current paths is tapped off via the capacitors 414 and 413 of the tank circuits and supplied to the AC/DC converter 42 via an insulating transformer 44.

The reactive power compensation as well as the adaptation of the power source to the load is achieved as described above.

Coupling capacitors are well known in the state of the art and are commonly used for various purposes, such as for example PLC-communication. Typically, their capacitance varies in a range between 3.5 nF and 20 nF for system voltages between 550 kV and 145 kV.

The invention is not limited to the described embodiments, and the person skilled in the art will readily be able to modify the shown embodiments within the scope of the claims.

Thus, for example, although advantageous, it is not necessary to provide the secondary winding of the ground level transformer respectively the primary winding of the load transformers with centre taps to provide balanced current paths.

The inductive coupling between the respective windings of the inductors 52 and 62, as described with reference to FIG. 1, may also be formed between the inductors 53 and 63 of the embodiment as described with reference to FIG. 2, or between the inductors 53' and 63' of the embodiment as described with reference to FIG. 4, and the current paths will then exhibit a low impedance for common mode currents also in these embodiments.

Alternatively, the tank circuit described with reference to FIG. 3 can be replaced by a transformer coupling the high frequency voltage generator to the current path.

The tank circuits at high voltage potential as described with reference to FIG. 4 may be replaced by a single inductor coupled between the conductor 2 and the coupling capacitors, and the power being tapped off via a single capacitor coupled to the junction between that inductor and the coupling capacitors and coupled to one end of the primary winding of the transformer 4, the other end of the primary winding being coupled to the conductor 2.

The invention claimed is:

1. An auxiliary power supply for a high voltage installation being in galvanic contact with a high voltage power transmission line, comprising:
   a power source at ground potential and thereby being independent of a state of the high voltage power transmission line, the power source comprising a high frequency voltage generator, a load circuit at high potential, the load circuit being connected to the high voltage installation, and a transmission link for coupling the power source to the load circuit in order to supply auxiliary power to the high voltage installation, the transmission link comprising a first and a second current path, each path being closed by a first capacitive coupling to provide insulation between the ground potential and the high potential, and each current path comprising a reactive compensation means for series compensation of reactive power generated by the first capacitive coupling.

2. The auxiliary power supply equipment according to claim 1, wherein said reactive compensation means comprises an inductor in series connection with the first capacitive coupling.

3. The auxiliary power supply equipment according to claim 1, further comprising:

adaptation means for adaptation of the power source to the load circuit by impedance matching.

4. The auxiliary power supply equipment according to claim 1, wherein the first and the second current path each comprise a series connection of the reactive compensation means and a coupling capacitor coupled to a conductor at the high voltage installation.

5. The auxiliary power supply equipment according to claim 1, wherein the high voltage installation is a series capacitor equipment mounted on a platform insulated from ground, wherein for one of said current paths said first capacitive coupling is provided by a stray capacitance between said platform and ground.

6. The auxiliary power supply equipment according to claim 1, wherein said voltage generator generates a voltage of a pre-selected frequency, wherein in each of said current paths said reactive compensation means form a series resonant circuit with said first capacitive coupling at the pre-selected frequency.

7. The auxiliary power supply equipment according to claim 5, wherein one of said first capacitive couplings comprise a coupling capacitor that is coupled to a conductor at the high voltage installation and coupled to ground potential via said reactive compensation means, and wherein said voltage generator is capacitively coupled by a second capacitive coupling to a junction between the reactive compensation means and the coupling capacitor of the first capacitive coupling.

8. The auxiliary power supply equipment according to claim 1, wherein said first capacitive couplings comprise coupling capacitors coupled to a conductor at the high voltage installation and coupled to ground potential via said reactive compensation means, and wherein said voltage generator is capacitively coupled by a second capacitive coupling to junctions between the respective reactive compensation means and the coupling capacitors of the first capacitive coupling.

9. The auxiliary power supply equipment according to claim 1, wherein said first capacitive couplings comprise coupling capacitors that are coupled to a conductor at the high voltage installation and coupled to ground potential via the reactive compensation means, and wherein said voltage generator comprises a ground level transformer and a high frequency DC/AC-converter, said ground level transformer having a primary winding coupled to the DC/AC-converter and a secondary winding coupled to said transmission link.

10. The auxiliary power supply equipment according to claim 8, wherein each of said reactive compensation means comprises an inductor with a winding, wherein the windings are magnetically coupled to each other so that said current paths exhibit a low impedance for common mode currents.

11. The auxiliary power supply equipment according to claim 1, wherein said first capacitive couplings comprise coupling capacitors coupled to a conductor at the high voltage installation via said reactive compensation means, and wherein said load circuit is capacitively coupled by a second capacitive coupling to junctions between the respective reactive compensation means and the coupling capacitors of the first capacitive coupling.

12. The auxiliary power supply equipment according to claim 1, wherein said load circuit comprises a load transformer and an AC/DC-converter, said load transformer comprising a primary winding coupled to said transmission link, and a secondary winding coupled to said AC/DC-converter.

13. A method for supplying auxiliary power to a high voltage installation being in galvanic contact with a high voltage power transmission line, the method comprising:

generating power referenced to ground and thereby being independent of a state of the high voltage power transmission line, forming a load circuit at high potential, connecting the load circuit to the high voltage installation, and transmitting the generated power to the load circuit in order to supply auxiliary power to the high voltage installation, wherein generating power comprises generating a high frequency voltage power, and wherein transmitting the generated power to the load circuit comprises forming a first and a second current path, each path closed by a capacitive coupling to provide insulation between the ground potential and the high potential, transmitting the generated power via said capacitive couplings, and providing in each current path a reactive compensation means for series compensation of reactive power generated by the capacitive couplings.

14. The method according to claim 13, wherein providing in each current path the reactive compensation means comprises providing an inductor in series connection with the capacitive coupling.

15. The method according to claim 13, wherein generating the high frequency voltage power makes use of a power source, and comprises adapting the power source to the load circuit by impedance matching.

16. The method according to claim 13, wherein transmitting the generated power to the load circuit further comprises providing in each of said first and the second current paths a series connection of the reactive compensation means and a coupling capacitor coupled to a conductor at the high voltage installation.

17. The method according to claim 13, wherein the high voltage installation comprises a series capacitor equipment mounted on a platform insulated from ground, wherein transmitting the power via the capacitive coupling comprises using a stray capacitance between said platform and ground to form said capacitive coupling.

18. The method according to claim 13, wherein generating a high frequency voltage power comprises pre-selecting a frequency for the voltage, and wherein providing in each current path the reactive compensation means comprises selecting said reactive compensation means to form a series resonant circuit with said capacitive coupling at the pre-selected frequency.

19. The method according to claim 17, wherein transmitting the generated power via the capacitive coupling comprises using a coupling capacitor that is coupled to a conductor at the high voltage installation and coupled to ground potential via said reactive compensation means, and further comprises capacitively coupling the generated high frequency voltage power to a junction between the reactive compensation means and the coupling capacitor.

20. The method according to claim 13, wherein transmitting the power via the capacitive coupling comprises using coupling capacitors that are coupled to a conductor at the high voltage installation and coupled to ground potential via said reactive compensation means, and further comprises capacitively coupling the generated high frequency voltage power to a junction between the respective reactive compensation means and the coupling capacitors.

21. The method according to claim 13, wherein transmitting the power via the capacitive coupling comprises using coupling capacitors that are coupled to a conductor at the high voltage installation and coupled to ground potential via said reactive compensation means, and further comprises inductively couple the generated high frequency voltage power to said current paths.

22. The method according to claim 20, wherein each of said reactive compensation means comprises an inductor with a winding, the method further comprising:

magnetically coupling the windings to each other so that said current paths exhibit a low impedance for common mode currents.

23. The method according to claim 21, wherein transmitting the power via the capacitive coupling comprises using coupling capacitors that are coupled to a conductor at the high voltage installation via said reactive compensation means, and further comprises capacitively coupling the transmitted auxiliary power to the load circuit.

24. The method according to claim 13, wherein transmitting the power via the capacitive coupling comprises using coupling capacitors that are coupled to a conductor at the high voltage installation, and further comprises inductively coupling the transmitted auxiliary power to the load circuit.

* * * * *